United States Patent [19]

Prosenbauer

[11] Patent Number: 4,575,899
[45] Date of Patent: Mar. 18, 1986

[54] APPARATUS FOR SEVERING THE MEAT FROM BONES

[75] Inventor: Otto Prosenbauer, Vienna, Austria

[73] Assignee: Inject Star Pokelmaschinen GmbH, Vienna

[21] Appl. No.: 612,825

[22] Filed: May 22, 1984

[30] Foreign Application Priority Data

May 27, 1983 [AT] Austria .................................. 1956/83

[51] Int. Cl.⁴ .............................................. A22C 17/04
[52] U.S. Cl. ......................................... 17/1 G; 17/46; 241/74
[58] Field of Search ............... 17/1 G, 46, 56; 241/24, 241/69, 74, 94

[56] References Cited

FOREIGN PATENT DOCUMENTS

| 0154152 | 3/1982 | German Democratic Rep. | 17/46 |
| 1563750 | 3/1980 | United Kingdom | 17/46 |
| 0878225 | 11/1981 | U.S.S.R. | 17/46 |

Primary Examiner—Willie G. Abercrombie
Attorney, Agent, or Firm—Townsend and Townsend

[57] ABSTRACT

A device for severing the meat adhering to bones from these bones has a press cavity provided with a press piston and a counter-piston, the mass of meat and bones introduced into the press cavity being pressed between said both pistons. Passage openings formed of a perforated filter are provided in the wall of the press cavity, noting that the meat having been brought into the pasty condition by the press pressure can pass through this openings, whereas the bones are retained. Both pistons have cylindrical sections and can be shifted in axial direction of the press cavity within this press cavity. The dimensions of the pistons are, as seen in radial direction, smaller than that of the press cavity. Both pistons have blunt, preferably slightly bomb-shaped front surfaces. One of the pistons releases during its retracting movement a discharge opening for discharging the pressed bones out of the press cavity. At least one of the pistons is provided with at least one abrading edge for the passage openings formed by the perforated filter. The stroke of this piston provided with the abrading edge preferably extends over all passage openings of the perforated filter.

12 Claims, 5 Drawing Figures

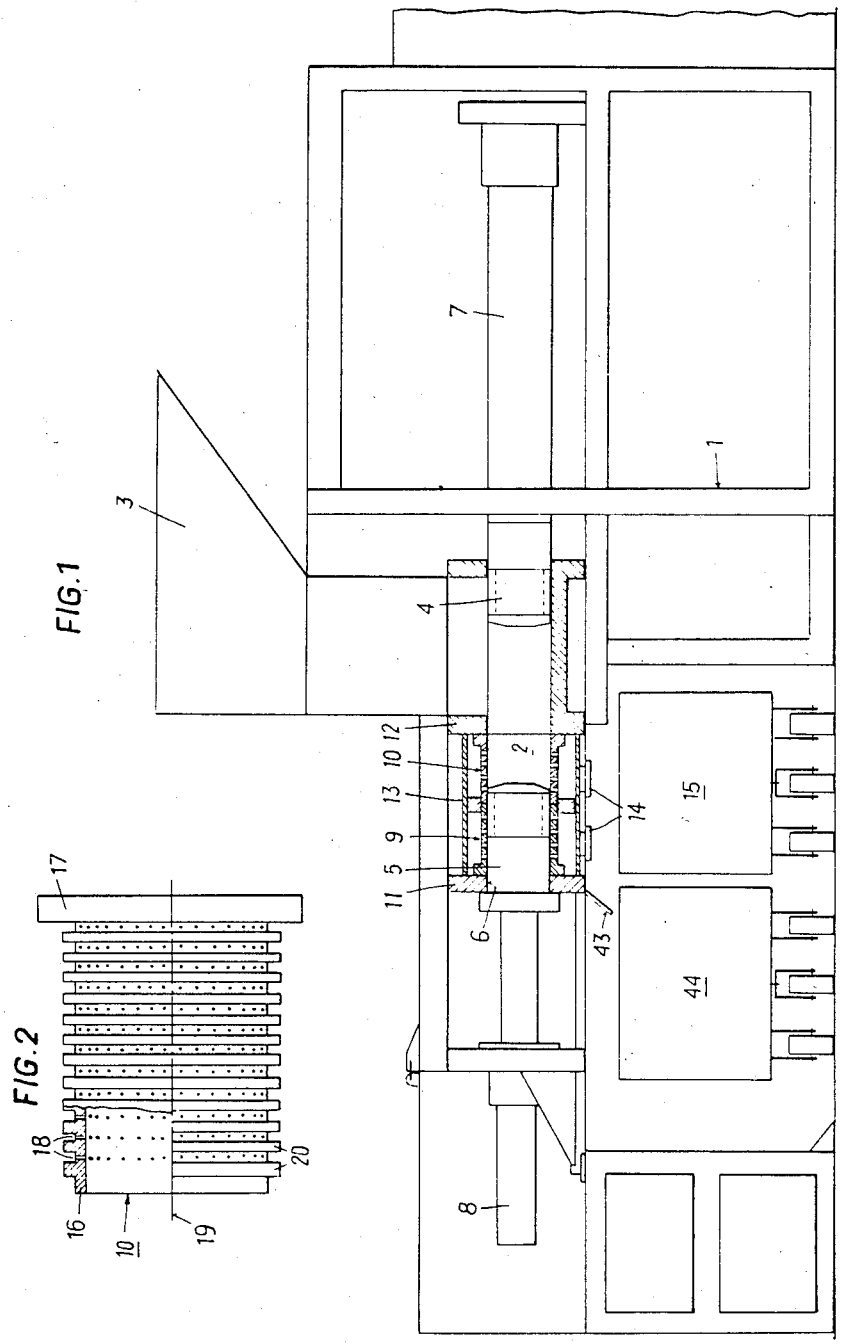

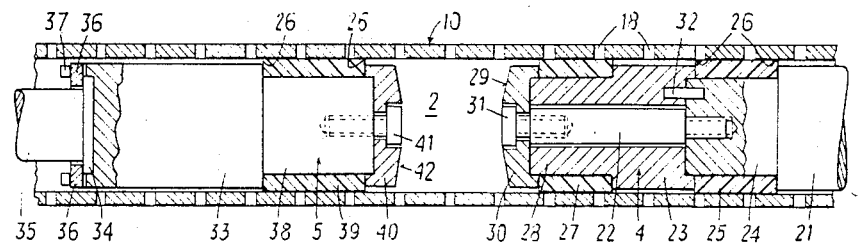
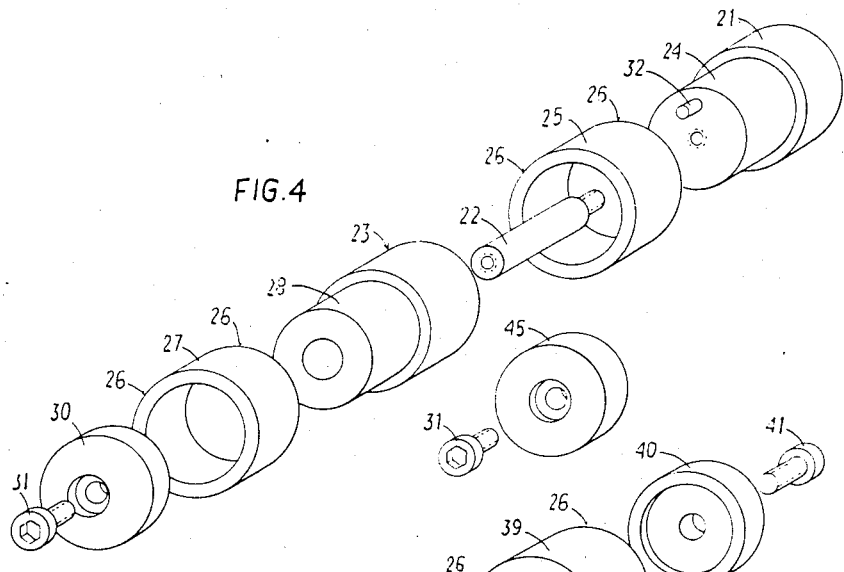
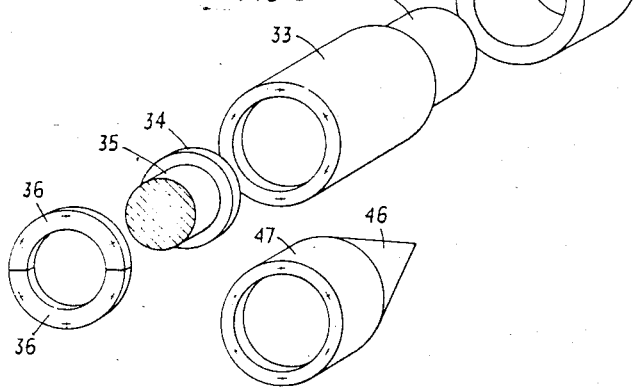

APPARATUS FOR SEVERING THE MEAT FROM BONES

BACKGROUND OF THE INVENTION

The invention refers to an apparatus press for severing the meat adhering on bones from these bones, in particular for poultry or poultry parts, respectively, for example whole chickens, turkeys or the like or parts of chickens, turkeys or the like, respectively, the bones being together with the meat adhering thereto introduced into the press cavity of a press and pressed therein between a press piston and a counter-piston, so that the meat is brought into a pasty condition. This pasty meat passes through passage openings provided in the wall of the press cavity and being not permeable for the bones.

When severing the meat adhering to bones, problems in connection with an insufficient yield and operational troubles occur in case of a high proportion of meat and this in particular in connection with chickens. It has been found that, for example when pressing whole chickens, the skin cloggs the passage openings of the press so that the yield is gradually lowered down to operation standstill. It has been tried to counteract this drawback by providing the counter-piston with a pointed tip directed against the press piston because it could be assumed that in this manner the pressure will be increased which acts within the press cavity in radial direction on the mass to be pressed. It has, however, been found that the passage openings still remain clogged and that in that end position of both pistons, in which these both pistons are in extreme proximity, a dead gap remains between the conical tip of the counter-piston and the press piston and that this dead gap can not completely be controlled.

SUMMARY OF THE INVENTION

It is an object of the invention to avoid these drawbacks and to provide an apparatus for severing the meat from bones which can be operated in a manner free of operation troubles.

It is a further object of the invention to provide an apparatus for severing the meat from bones in which a cleaning effect at the passage openings during operation is obtained, so that these passage openings are prevented from becoming clogged.

It is a further object of the invention to design the apparatus for severing the meat from bones such that the efficiency of the apparatus is improved and the yield is increased.

An other object of the invention is to provide an apparatus for severing the meat from bones, in which the bones are, together with the meat adhering thereto, moved several times in direction to the discharge opening of the press cavity. It is a further object of the invention to design the apparatus for severing the meat from bones such that this apparatus is not only suitable for severing chicken meat but also for pressing bones of swines and cattle having meat adhering thereto.

In the apparatus according to the invention, openings are provided in the wall of the press cavity, through which openings the meat can pass which has been brought into the pasty condition by the press pressure, whereas the bones are retained, noting that both pistons have cylindrical sections and can be shifted within the press cavity in axial direction thereof, one of said pistons releasing, during its retracting movement, a discharge opening for discharging the pressed bones from the press cavity. Both pistons have blunt, preferably slightly bomb-shaped, front surfaces, and at least said one piston is provided with at least one abrading edge for the openings formed of a perforated filter. On account of the blunt surfaces of said both pistons, the initially mentioned dead gap is avoided and both pistons can, while pressing the material approach one the other to such an extent, that only a very small parcel of pressed bones remains between said both pistons. The bomb-shape of the front surfaces facilitates detaching of the residual bone mass. The passages formed by the perforated filter are continuously scrubbed free by the abrading edge, and this effect is added to the cleaning effect provided by the pressure in longitudinal direction of the press cavity and along the openings of the perforated filter. In this case, the arrangement is preferably such that the stroke of at least one piston provided with an abrading edge extends over all openings of the perforated filter for the purpose of extending the cleaning effect over all openings of the perforated filter. It is particularly favourable if the strokes of both of said pistons overlap at least within the area of the perforated filter, because it is just then that the material to be pressed and the abrading edges exert the best effect on the openings of the perforated filter.

The perforated filter conveniently consists of a thin-walled mantle perforated by rounded holes being arranged with their axes along a plurality of circles staggered one relative to the other in direction of the axis of the perforated filter, each of said circles being located in concentric relation to the axis of the perforated filter and a circumferential reinforcing rib being arranged on the outer mantle of the perforated filter between two such circles each. The reason therefor is that the openings of the perforated filter frequently have a very small diameter within a preferred range between 1.2 to 2 mm. Openings having a diameter of about 1.5 mm can, however, no more reliably and economically, respectively, be bored into a thick-walled material. It is thus necessary to use a thin-walled material for the mantle for the perforated filter, which, however, results in the risk that the thin-walled mantle of the perforated filter can no more withstand the pressure generated during pressing operation. This risk is prevented by the reinforcing ribs. In this case it is convenient to design the perforated filter as one single part, although it would also be possible to provide an assembly of correspondingly designed rings.

For the purpose of making the apparatus suitable not only for pressing chicken meat but also for pressing bones of swines of cattle having meat adhering thereto, it is to recommend that the blunt front surface of the counter-piston is carried by a removable extenstion and can be interchanged for a constructional part carrying a pointed front surface. Analogously thereto, the arrangement for the press piston has in such a case to be selected such that the blunt front surface of the piston is carried by a removable extension. This provides the possibilty to adapt the apparatus to the type of the mass just to be pressed with low expenditure of time and material.

The abrading edge can be formed by the front surface of the piston itself, but it is preferred that at least one abrading edge is formed of a bushing, preferably of synthetic plastics material, radialy protruding beyond the front surface. Suitable food-resistent synthetic plastics materials, for example polyamide, polyurethane and so on, are known.

BRIEF DESCRIPTION OF THE DRAWINGS

An embodiment of the invention is schematically shown in the annexed drawings.

In the drawing

FIG. 1 shows a vertical section through the apparatus,

FIG. 2 shows a view of a perforated filter, partially in a section,

FIG. 3 shows an axial section through both pistons in an enlarged scale,

FIG. 4 shows in an exploded view the construction of the press piston as well as its possible adaptation and FIG. 5 shows in an exploded view the construction of the counter-piston and its adaptation, respectively.

DETAILED DESCRIPTION OF THE DRAWINGS

The apparatus according to FIG. 1 has a frame 1, within which a press cavity 2 is arranged with its axis directed in horizontal direction, noting that the mass of meat and bone to be pressed can be introduced into this press cavity via a supply hopper 3. A press piston 4 and a counter-piston 5 are guided within the press cavity with sliding fit, said pistons closing the press cavity 2 at both of its front ends. In its fully retracted position, the counter-piston 5 releases a discharge opening 6 for the pressed bones through which the pressed parcel of bones is expelled by the press piston 4. Said both pistons 4, 5 are, conveniently hydraulically, actuated by pressurized fluid cylinders 7 and 8, respectively, fixed within the frame 1. In its completely retracted position, the press piston 4 releases the opening leading from the supply hopper 3 into the press cavity 2 to such an extent that the mass to be pressed and introduced into the supply hopper 3 can enter the press cavity 2 in an unobstructed manner. The wall of the press cavity 2 is formed of two perforated filters 9, 10, arranged one behind the other and maintained in position between two stationary walls 11, 12 of the frame 1, one (10) being shown in FIG. 2 in an enlarged scale. Said both perforated filters 9, 10 are surrounded by a collecting cylinder 13 for the meat having been brought into a pasty condition under the action of the pressure prevailing within the press, said collecting cylinder being provided with connection pieces 14 for connecting thereto hoses not shown via which the meat can be supplied into a container, for example a transport carriage 15.

The perforated filter 10 (FIG. 2) represents one single part and has a comparatively thin-walled mantle 16 which terminates in a connecting flange 17 at one front end of the perforated filter 10. The mantle 16 is perforated by a plurality of passage openings 18 through which the meat can pass having been brought into a pasty condition but which retain the bones. Each passage opening 18 is formed of a bore within the mantle 16 having a diameter within the range of about 1.2 to about 2.0 mm, preferably about 1.5 mm. The passage openings 18 are arranged along several circles in concentric relation to the axis 19 of the perforated filter 10, said circles having mutually equal distances one from the other. The passage openings 18 are distributed with mutually equal distances one from the other along each circle. Between each pair of two such circles there is arranged on the outer surface of the mantle 16 a circumferential rib 20 which reinforces the mantle such that it can withstand the pressure prevailing within the press cavity 2. This provides the required mechanical strength of the one-piece perforated filter 10.

In FIG. 3, the pistons, i.e. the press piston 4 and the counter piston 5, cooperating with the perforated filter 10 are shown in a greater scale. The perforated filter is only schematically indicated and its ribs 20 are omitted for better clarity.

The press piston 4 is fixed to its piston rod 21 by means of an extension bolt 22 which is screwed into a threaded bore at the forward front end of the piston 21. An extension piece 23 is put onto this extension bolt 22, noting that between this extension piece 23 and the piston rod 21 a bushing 25 of synthetic plastics material is seated along a stepped reduction 24 of the end of the piston rod, said bushing 25 forming with both of its front edges abrading edges 26 cleaning during each stroke of the press piston 4 the passage openings 18. An analogously designed bushing 27 is arranged on a stepped reduction 28 of the extension piece 23 and is maintained in position by a press plate 30 forming the forward and slightly bomb-shaped front surface 29 of the press piston 4 and being fixed by a central sunk screw 31 on the extension bolt 22. Said both bushings 25, 27 form in this construction the guide means for guiding the press piston 4 along the wall of the press cavity 2 formed by the perforated filter 10. The component parts of the press piston 4 are shown in FIG. 4 in an exploded view. A setpin 32 of the piston rod 21 prevents any rotation of the extension piece 23 relative to the piston rod 21.

Also the counter-piston 5 has an extension piece 33 embracing a flange 34 of the piston rod 35 and being fixed there by means of two half-shells 36 with screws 37. The extension piece 33 carries on a reduction 38 a bushing 39 of synthetic plastics material simultaneously forming a guide means for guiding the counter-piston 5 along the wall of the press cavity 2 as well as two abrading edges 26 for the passage openings 18 of the perforated filter 10. The bushing 39 is maintained in position on the front end of the counter-piston 5 by means of a press plate 40 screwed to the front end of the extension piece 33 by means of a sunk screw 41. The front surface 42 of the press plate 40 is slightly bomb-shaped for facilitating detaching of the press cake of pressed bones.

As can be seen, the bushings 25, 27, 39 somewhat protrude in radial direction beyond the circumference of the press plates 30, 40 for making the abrading edges 26 more effective.

During operation the procedure is conveniently such that both pistons 4, 5 are first (as seen in FIG. 1) moved in the extreme right-hand position. Subsequently, a charge of mass to be pressed is introduced into the press cavity 2 via the supply hopper 3 and the press piston 4 is advanced. The meat is started to be pressed in outward direction through the perforated filter 9 located adjacent the supply hopper and having passage openings 18 of conveniently somewhat greater diameter than is the diameter of the passage openings of the perforated filter 10. Most favourable values have been found with openings of a diameter between about 1.5 and 2.0 mm in the perforated filter 9 and with openings of a diameter between about 1.2 and 1.5 mm in the perforated filter 10. After having pressed the first charge, the press piston 4 is retracted and a new charge is introduced into the press cavity 2, which new charge is then pressed together with the residue of the first charge. In this case, the counter-piston 5 is somewhat retracted so that new passage openings 18 are uncovered or released. By the described retracting movement and advancing movement of the press piston 4, the passage openings 18 are simultaneously at least partially cleaned. After retracting the press piston 4, a further charge is introduced into the press cavity 2 and a subsequent pressing step is performed thereby retracting again the counter-piston 5 for some distance. This procedure can be repeated several times until the remaining pressing residue is expelled through the discharge opening 6. This is accomplished by moving the pistons 4, 5 in the same direction and in direction to the discharge opening 6 until the piston 5 releases this discharge opening 6. However, the press pressure is maintained while moving said both pistons 4, 5 in the same direction so that even during this final movement of the press cake in direction to the discharge opening 6 pressing is continued and residual meat mass is obtained. The bone residues expelled through the discharge opening 6 fall into a further transport carriage 44 via a chute 43.

A modified embodiment consists in that the counter-piston 5 is for each single charge moved during pressing this charge also in direction to the supply hopper 3 so that pressing of each charge is effected while simultaneously moving both pistons in both directions. This favourizes cleaning by abrading of the passage openings.

As can be derived from FIGS. 4 and 5, it is easily possible to adapt the apparatus for pressing bones of swine or cattle. For this purpose it is only necessary to remove in connection with the press piston (FIG. 4) the component parts 22, 23, 27 and optionally also 30 and to mount an other press plate 45 or to optionally mount also the press plate 30 at the forward surface of the piston rod 21. In connection with the counter-piston (FIG. 5), only the constructional parts 33, 39 and 40 must be removed. In place of the press plate 40, a counter-piston 47 provided with a pointed tip 46 is clamped on the flange 34 of the piston rod 35 by means of said both half-shells 36 and the screws 37, respectively. if desired, also said both perforated filters 9, 10 or only one of said filters can be interchanged for an annular filter comprising slots extending in circumferential direction between adjacent rings, because such annular filters are, as a rule, more favourable than perforated filters for pressing bones of swines or cattle having meat adhering thereto.

What is claimed is:

1. A press for severing meat from bones, comprising:
   a cylindrical wall having first and second ends and defining a press cavity, said wall including openings sized to permit the passage of meat and to prevent the passage of bone therethrough;
   a press piston adapted to enter said press cavity from the first end by movement in an axial direction of the cylindrical wall, said press piston including:
      a first blunt front surface of smaller diameter than the diameter of said press cavity;
      a cylindrical section for guiding the piston along said cylindrical wall;
   a counter piston adapted to enter said press cavity from the second end by movement in axial direction of the cylindrical wall, said counter piston including:
      a second blunt front surface of smaller diameter than the diameter of said press cavity;
      a cylindrical section for guiding the piston along said cylindrical wall;
   a discharge means for expelling pressed bones from said press cavity, said discharge means being adapted to be opened and closed by correspondingly moving one of said pistons; and
   means carried by the cylindrical section of at least one of said pistons defining an abrading edge for cleaning said openings in said cylindrical wall during each piston stroke.

2. A press for severing meat from bones, comprising:
   a cylincrical wall having a first and second ends defining a press cavity and a multiplicity of openings therethrough adapted to permit the passage of pasty meat and prevent the passage of bones;
   a press piston adapted to enter said press cavity from the first end and axially move in the press cavity, the press piston including first cap means forming a first blunt front surface of a smaller diameter than the diameter of said press cavity and a cylindrical section for guiding the piston along said cylindrical wall;
   a counter piston adapted to enter said press cavity from the front end and axially move in the press cavity, said counter piston including second cap means forming a second blunt front surface of a smaller diameter than the diameter of said press cavity, and a cylindrical section for guiding the piston along said cylindrical wall;
   a discharge chute for expelling the pressed bones from said press cavity, said chute being opened and closed by the movement of one of said pistons; and
   a bushing carried by at least one of the pistons and radially protruding beyond the corresponding cap means to thereby form an abrading edge for cleaning said openings in said cylindrical wall during each piston stroke.

3. The press of claim 1, wherein said cylindrical wall comprises at least one perforated filter through which meat may pass.

4. The press as claimed in claim 1, wherein the blunt front surfaces of both pistons are slightly bomb-shaped.

5. The press as claimed in claim 1, wherein the stroke of at least one piston provided with the abrading edge extends over all said openings in said wall.

6. The press as claimed in claim 3, wherein the strokes of both said pistons overlap at least within the area of the perforated filter.

7. The press as claimed in claim 1, including a removable extension, and wherein the blunt front surface of the counterpiston is carried by the removable extension and is interchangeable for a constructional part provided with a tip.

8. The press as claimed in claim 7, wherein the constructional part provided with a tip is a piston.

9. The press as claimed in claim 1, including a removable extension, and wherein the first blunt front surface of the press piston is carried by the removable extension piece.

10. The press as claimed in claim 2, wherein the bushing consists of synthetic plastics material.

11. The press as claimed in claim 3, wherein at least one perforated filter comprises:
    a thin-walled mantle perforated by rounded holes arranged with their axes along circles mutually staggered one relative to the other in the direction of the axis of the perforated fiter, each of said circles being concentrically located relative to the axis of the perforated filter; and a circumferencial reinforcing rib being arranged between each two such circles.

12. The press as claimed in claim 11, wherein, the perforated filter is of a one-piece construction.

* * * * *